United States Patent
Isaka (10) Patent No.: US 6,654,455 B1
(45) Date of Patent: Nov. 25, 2003

(54) IP CONFERENCE TELEPHONE SYSTEM COMPATIBLE WITH IP-PBX SYSTEMS

(75) Inventor: Masazumi Isaka, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/536,776

(22) Filed: Mar. 28, 2000

(30) Foreign Application Priority Data

Jun. 9, 1999 (JP) ............................................ 11-162065

(51) Int. Cl.[7] ............................ H04L 12/18; H04M 3/56
(52) U.S. Cl. .................. 379/202.01; 370/261; 370/263; 370/266; 370/269
(58) Field of Search ................................. 370/259, 260, 370/261, 262, 263, 264, 265, 266, 268, 269, 270, 271; 379/202.01, 203.01, 204.01, 205.01, 206.01

(56) References Cited

U.S. PATENT DOCUMENTS

| | | | | |
|---|---|---|---|---|
| 5,963,547 A | * | 10/1999 | O'Neil et al. | 370/260 |
| 6,173,314 B1 | * | 1/2001 | Kurashima et al. | 709/204 |
| 6,404,746 B1 | * | 6/2002 | Cave et al. | 370/262 |
| 6,493,324 B1 | * | 12/2002 | Truetken | 370/261 |

FOREIGN PATENT DOCUMENTS

| | | | | |
|---|---|---|---|---|
| CA | 2240878 | 12/1998 | .......... | H04L/29/06 |
| JP | 121059 | 4/1994 | .......... | H04M/3/56 |
| JP | 98139 | 4/1999 | .......... | H04L/12/18 |

* cited by examiner

*Primary Examiner*—Harry S. Hong
(74) *Attorney, Agent, or Firm*—Rabin & Berdo, P.C.

(57) ABSTRACT

An IP (Internet Protocol) conference telephone system feasible for an IP-PBX (Private Branch Exchange) includes a communication control connected to an IP network. When a connection for a conference is set up between a plurality of telephones accommodated in the IP network, each telephone packetizes a voice signal and sends the resulting packet to the network to address it to a conference trunk. An IP bridge interconnected to the network receives packets via the network 10, multiplexes the voice signals of the packets on the channels of a down-going highway each corresponding to a particular telephone, and sends the multiplexed voice signals to the conference trunk. The conference trunk performs addition and subtraction with the above voice signals and returns the results of addition and subtraction on an up-going highway. This allows a conference to be held between the telephones. A multicast router may be substituted for the conference trunk, in which case the network will be adaptive to multicast.

6 Claims, 4 Drawing Sheets

IP CONFERENCE TELEPHONE SYSTEM COMPATIBLE WITH IP-PBX SYSTEMS

BACKGROUND OF THE INVENTION

1. Field of the Invention

The present invention relates to an IP (Internet Protocol) conference telephone system and more particularly to an IP conference telephone system advantageously applicable to, e.g., a private branch exchange (PBX) system.

2. Description of the Background Art

A conference telephone service is not available with the state-of-the-art IP-PBX system that assembles a voice signal into an IP packet and connects it by switching. A conventional digital PBX system includes a time-division switch accommodating a highway to which a conference trunk or bridge is connected. Voice signals are sent from telephone subscriber sets accommodated in a subscriber circuit to the time-division switch by being multiplexed on the preselected channels of the highway. The switch switches the voice signals to the conference trunk. The conference trunk adds all the voice signals on the channels of the telephones to be connected for a session except for a voice signal on the channel assigned to a particular telephone. The conference trunk then returns the resulting sum signal to the switch as a signal on the channel of the above particular telephone subscriber set.

Today, the IP-PBX system can be readily implemented with the spreading Intranet practicable with, e.g., a LAN (Local Area Network). Therefore, a conference telephone service available with the digital PBX should preferably be realized with the IP-PBX system also.

SUMMARY OF THE INVENTION

It is therefore an object of the present invention to provide an IP conference telephone system particularly feasible for an IP-PBX system.

In accordance with the present invention, an IP conference telephone system includes a network for transferring IP packets. A plurality of telephone terminal systems include telephone terminals and are accommodated in the network. The telephone terminal systems convert packets received via the network to voice signals and send the voice signals to the telephone terminal, while converting voice signals received from the telephone terminals to packets and sending them to the network. A communication control is connected to the network and sets up, in response to a conference connection request received from any one of the telephone terminal systems, a conference connection to at least three telephone terminal systems relating to the conference connection request. A highway transfers voice signals multiplexed on channels thereof. An IP bridge is connected to the network and highway for multiplexing voice signals of packets received via the network and converting voice signals received over the highway and multiplexed on the channels to packets to thereby send the packets to the network. A conference trunk is interconnected to the highway for performing, upon receiving packets from the at least three telephone terminal systems, addition and subtraction with the voice signals of the packets and returning the results of addition and subtraction to the highway. The at least three telephone terminal systems connected for a conference send packets of voice signals received from the telephone terminals to the network to address them to the conference trunk. This allows a conference to be held between the at least three telephone terminal systems.

A multicast router may be substituted for the above conference trunk for managing a multicast group including the at least three telephone terminal systems in accordance with a multicast address. In such a case, the at least three telephone terminal systems each assign the multicast address to a packet of a voice signal output from the respective telephone terminal and send the packet to the network. Upon receiving the packet with the multicast address from any one of the at least three telephone terminal systems, the network transfers the packet to the other telephone terminals.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
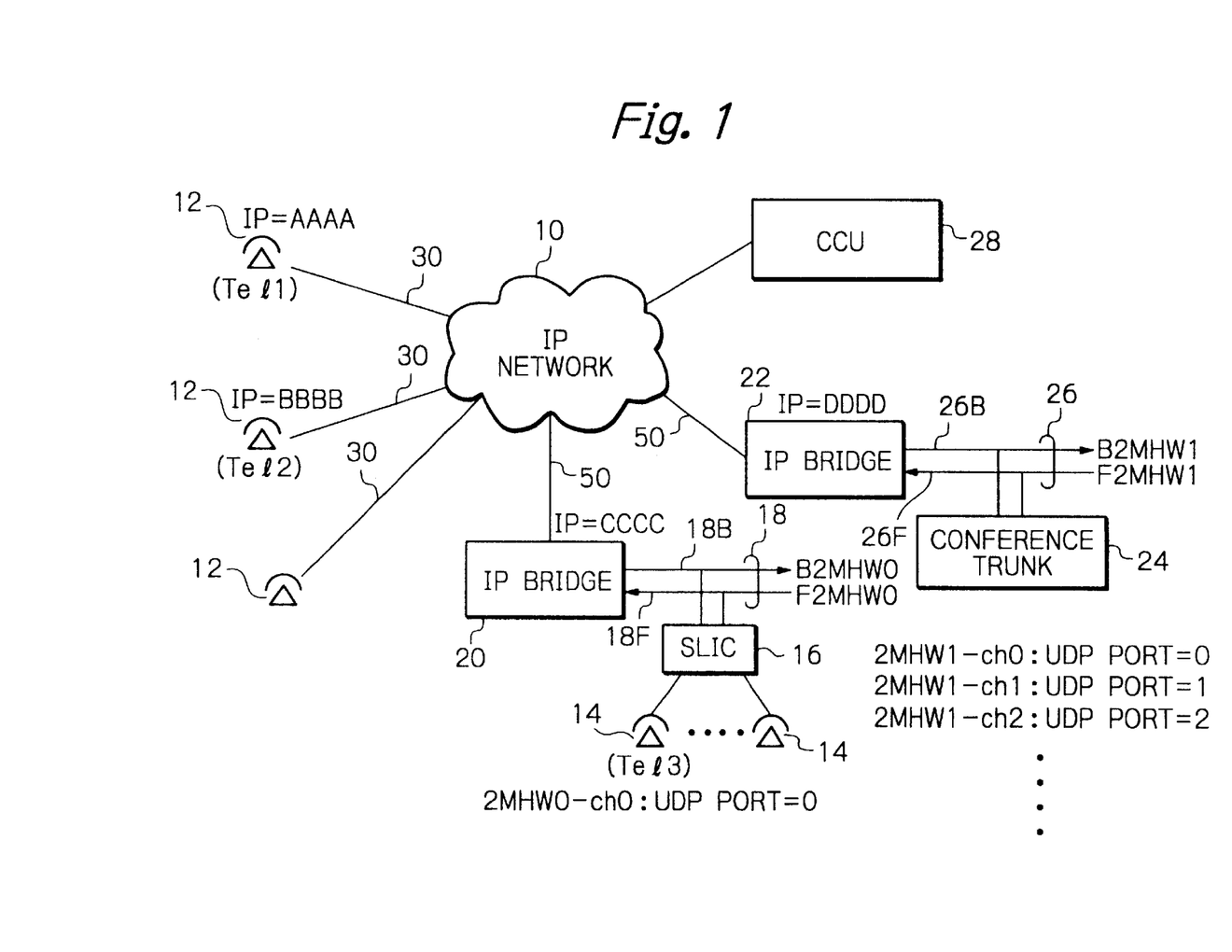
FIG. 1 schematically shows a preferred embodiment of an IP-PBX system to which an IP conference telephone system embodying the present invention is applied.

Referring to FIG. 1 of the drawings, an IP conference telephone system embodying the present invention will be described which is applied to an IP-PBX system by way of example. As shown, the IP-PBX system includes, an IP network 10. In the illustrative embodiment, the IP network 10 is a LAN or Intranet arranged in a private facility and constituting an Ethernet packet transfer network. The IP network 10 accommodates a number of IP telephones 12 although only three IP telephones 12 are shown in FIG. 1 for the sake of simplicity of illustration. Each IP telephone 12 is a telephone terminal, or subscriber set, capable of selectively assembling a voice signal into an IP packet and sending the packet to the IP network 10 or disassembling a received IP packet to thereby reproduce a voice signal. The IP network 10 is connected to Internet, not shown, also.

The IP-PBX system accommodates analog telephones or similar conventional plain telephones 14 in addition to the IP telephones 12. The plain telephones 14 are accommodated in a subscriber circuit (SLIC) 16 which is, in turn, interconnected to an IP bridge 20 via a highway (HW) 18. In the illustrative embodiment, the highway 18 is a 2 Mbps (megabits per second) signal transmission path (2MHW) in which thirty voice channels, one signal channel and one idle or reserved channel are multiplexed to a transmission rate of 2 Mbps. The SLIC 16 encodes voice signals received from the plain telephones 14 by, in the illustrative embodiment, PCM (Pulse Code Modulation) and multiplexes the resulting coded signals on the voice channels of a frame 100, see FIG. 4. The multiplexed signals are sent to an up-going highway (F2MHW) 18F. When the SLIC 16 receives the frame 100 on a down-going highway (B2MHW) 18B, it demultiplexes the channels of the frame 100 to thereby reproduce voice signals and sends the voice signals to the plain telephones 14 to which the above channels are assigned.

The IP bridge 20, which is interconnected to the IP network 10, assembles the frame 100, received on the up-going highway 18F into an IP packet and sends the IP packet to the IP network 10. When the IP bridge 20 receives an IP packet from the IP network 10, it disassembles the latter and sends the resulting frame 100 to the down-going highway 18B.

Another IP bridge 22 is accommodated in the IP network 10 and may have the same configuration as the IP bridge 20. A highway 26 accommodating a conference trunk or bridge is interconnected to the IP bridge 22. The IP bridge 22, like the IP bridge 20, assembles a frame 100 received on an up-going highway 26F into an IP packet and sends the IP packet to the IP network 10. When the IP bridge 22 receives an IP packet from the IP network 10, it disassembles the IP packet and sends the resulting frame 100 to a down-going highway 26B.

The conference trunk or bridge 24 adds, among the voice signals of the channels arriving via the down-going highway 26B, the voice signals of all the channels participating in a conference connection while removing the voice signal of a particular channel, as will be described more specifically later. The resulting signals are sent to the IP bridge 22 over the up-going highway 26B. In this manner, the conference trunk 24 accomplishes a conference connection.

The IP network 10 includes a communication control unit (CCU) 28 playing the role of a central controller. In response to a path connection request or similar call processing request received from any one of the IP telephones 12 and plain telephones 14, the CCU 28 sets up a connection for communication to be held between the telephone sets 12 and 14 within the IP network or LAN 10 via extensions or between the telephones 12 and 14 and Internet to which the IP network 10 is connected. In the illustrative embodiment, the CCU 28 executes such call connection under the control of a call processing program implementing the ordinary PBX functions that set up the above-described communications using extensions or central office lines. Particularly, in accordance with the present invention, the call processing program includes a routine for implementing a conference telephone service that allows a session to be held between three or more of the telephones 12 and 14. This conference telephone function is effectively applicable even to the connection of the telephones 12 and 14 to Internet via the IP network 10.

Figure 2:
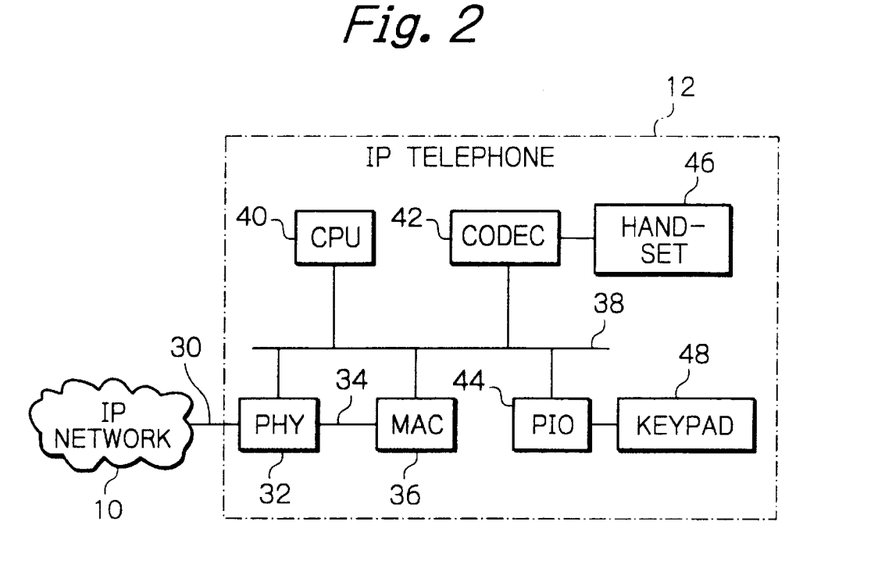
FIG. 2 is a schematic block diagram showing a specific configuration of an IP telephone subscriber set included in the illustrative embodiment.

As shown in FIG. 2 specifically, the IP telephone 12 includes a signal conversion circuit, or protocol hybrid (PHY) 32 interconnected to the IP network 20 by a line 30. The signal converter 32 converts an Ethernet electric signal received on the IP network 10 to an Ethernet frame and outputs the Ethernet frame to a connection line 34. Also, the signal converter 32 receives an Ethernet frame transferred within the IP telephone 12 over the connection line 34, converts it to an Ethernet electric signal, and sends the Ethernet electric signal to the IP network 10. The connection line 34 is connected to a media access controller (MAC) 36.

A bus 38 connects the above MAC 36 to a central processing unit (CPU) 40, a coder/decoder (CODEC) 42, and a keypad input/output circuit (PIO), or key interface, 44. AUDP (User Datagram Protocol)/IP packet or a TCP (Transfer Control Protocol)/IP packet is transferred over the bus 38. The MAC 36 assembles such a packet into an Ethernet frame and delivers the frame to the signal converter 32 or disassembles an Ethernet frame received from the signal converter 32 to thereby output a UDP/IP packet or a TCP/IP packet onto the bus 38.

The CODEC 42 is interconnected to a handset 46 included in the IP telephone set 12. The CODEC 42 converts, or encodes, an analog voice signal input to a transmitter included in the handset 46 to a digital PCM signal. Also, the CODEC 42 converts, or decodes, a PCM signal transferred from the MAC 34 to a corresponding analog voice signal and outputs the voice signal via a receiver also included in the handset 46. The CODEC 42 has a buffer capacity capable of storing at least a single IP packet of data for a moment.

The key interface 44 is interconnected to a keypad 48 provided on the IP telephone set 12 and delivers a signal representative of the condition of the keypad 48, i.e., a key input to the CPU 40. The keypad 48 has various keys provided for operating the IP telephone 12, e.g., dial keys, hook keys and function keys. The operator of the telephone 12 may operate the keypad 48 in order to input a call connection request or to use the various functions of the IP-PBX including the conference telephone service.

The CPU 40 includes a processing system for executing the control programs of the IP telephone 12. The CPU 40 interchanges call processing information with the CCU 28 over the IP network 10 under the control of the control programs, thereby totally controlling the operations of the telephone 12. For example, voice signals are interchanged between the IP network 10 and the handset 46 under the control of the CPU 40. More specifically, the CPU 40 reads out voice data converted to a PCM signal by the CODEC 42 from the CODEC 42, adds a UDP/IP header, not shown, to the voice data to thereby assemble a packet, and sends the packet to the IP network 10 via the MAC 36. Also, the CPU 40 removes a header from a UDP/IP packet received from the IP network 10 and then writes the packet into the CODEC 42. In this manner, the CPU 40 has an additional function of assembling and disassembling a packet.

Figure 3:
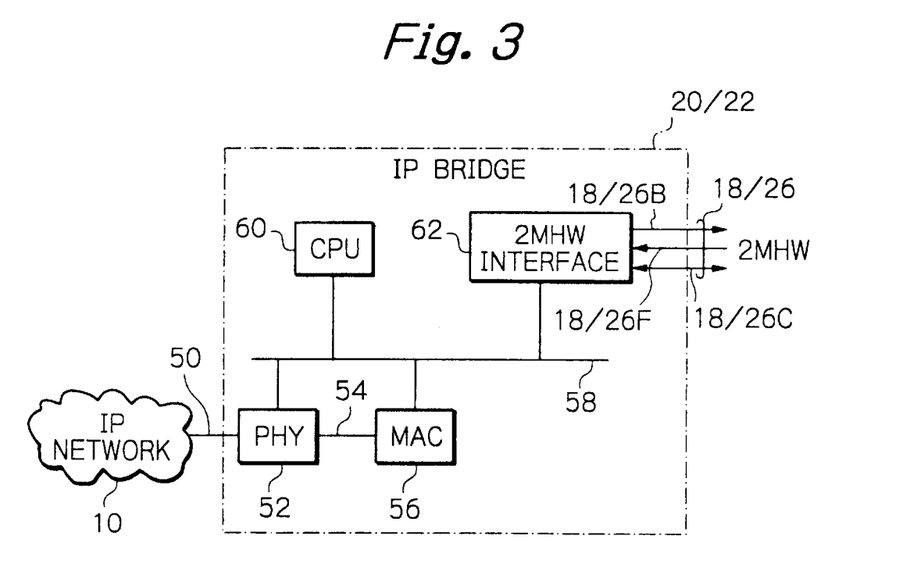
FIG. 3 is a schematic block diagram showing a specific configuration of an IP bridge also included in the illustrative embodiment.

FIG. 3 shows a specific configuration of the IP bridge 20. The other IP bridge 22 is identical in configuration with the IP bridge 20 and will not be described specifically. As shown, the IP bridge 20 includes a PHY or signal conversion circuit 52 interconnected to the IP network 10 by a line 50. The signal converter 52, like the converter 32, converts an Ethernet electric signal received over the IP network 10 to an Ethernet frame and outputs the Ethernet frame to a connection line 54. Also, the signal converter 52 receives an Ethernet frame transferred within the IP bridge 20 12 over the connection line 54, converts it to an Ethernet electric signal, and sends the Ethernet electric signal to the IP network 10. The connection line 54 is connected to an MAC or media access controller 56.

A bus 58 connects the above MAC 56 to a CPU 60 and a 2MHW interface 62. A UDP/IP packet or a TCP/IP packet is transferred over the bus 58. The MAC 56 assembles such a packet into an Ethernet frame and delivers the frame to the signal converter 52 or disassembles an Ethernet frame received from the signal converter 52 to thereby output a UDP/IP packet or a TCP/IP packet to the bus 58.

The 2MHW interface 62 is interconnected to the highway 18 and interfaces the highway 18 and IP bridge 20. The interface 62 assembles the PCM digital voice signals of the channels of the frame 100 received over the up-going highway 18F into packets. Also, the interface 62 multiplexes the PCM signals of IP packets transferred from the MAC 56 on the channels of the frame 100 and outputs the multiplexed PCM signals to the down-going highway 18B. The interface 62 has a buffer capacity great enough to store at least a single packet of data for a moment and includes a dual-port memory, not shown. The dual-port memory allows the CPU 60 to interchange control signals 18C with various line packages accommodated in the highway 18.

The CPU 60 includes a processing system for executing the control programs of the IP bridge 20. The CPU 60 interchanges call processing information with the CCU 28 over the IP network 10 under the control of the above-described control programs, thereby totally controlling the operations of the IP bridge 20. For example, voice signals are interchanged between the IP network 10 and the interface 62 under the control of the CPU 60. More specifically, the CPU 60 reads out PCM voice data arrived at the interface 62 from the interface 62, adds a UDP/IP header, not shown, to the voice data to thereby assemble a packet, and sends the packet to the IP network 10 via the MAC 56. Also, the CPU 60 removes a header from a UDP/IP packet received from the IP network 10 and then writes the packet into the interface 62. In this manner, the CPU 60 has an additional function of assembling and disassembling a packet.

Referring again to FIG. 1, the conference trunk 24 performs addition and subtraction with the PCM voice data coming in over the down-going highway 26B in order to implement conversation during session. For example, assume that a session is held between two IP telephones 12 (Tels 1 and 2) and one plain telephone 14 (Tel 3). The operation of the conference trunk 24 will be described specifically with reference to FIG. 4.

Figure 4:
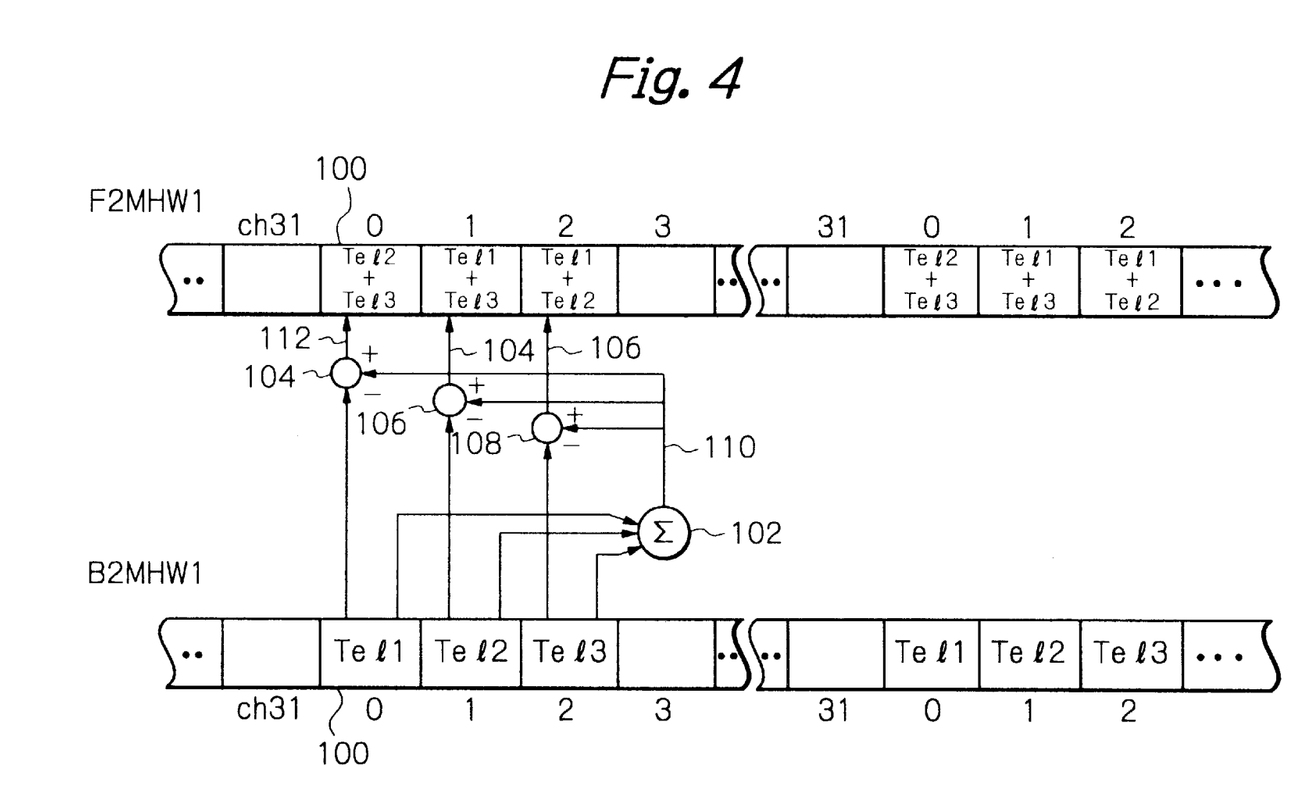
FIG. 4 is a view useful for understanding the function of a conference trunk further included in the illustrative embodiment.

As shown in FIG. 4, assume, that the frame 100 has consecutive channels (ch) #0 through #31 and that the PCM voice data of the telephone sets, Tels 1, 2 and 3, are multiplexed on the channels #1, #2 and #3, respectively. Upon receiving the frame 100, the conference trunk 24 first adds the voice signals of the three channels #1, #2 and #3, as indicated by a summation symbol 102, and outputs a voice signal 110 representative of the resultant sum Subsequently, the trunk 24 subtracts the voice signal of the individual channel from the voice signal 110, e.g., subtracts the voice signal of the telephone, Tel 1, for the channel #0, subtracts the voice signal of the telephone, Tel 2, for the channel #1, and subtracts the voice signal of the telephone, Tel 3, for the channel #2, as indicated by subtraction symbols 104, 106 and 108. The resulting voice signals 112, 114 and 116 respectively contain the voice signals of the telephones, Tels 2 and 3, the voice signals of the telephones, Tels 1 and 3, and the voice signals of the telephones, Tels 1 and 2. The trunk 24 multiplexes the voice signals 112, 114 and 116 on the channels #0 through #3, respectively, and sends the multiplexed voice signals over the up-going highway or F2MHW1 26B. This allows a session to be held between the telephones, Tels 1, 2 and 3. A session can, of course, be held between four or more telephones, as desired.

In operation, to hold a session between the telephones, Tels 1, 2 and 3, one or more of the operators of the telephones, Tels 1, 2 and 3 manipulates them in order to send a conference connection request to the CCU 28. For example, assume that the operators of the telephones, Tels 1 and 2, are talking to each other in the conventional manner. In this case, a call connection is set up by ordinary extension connection processing while the communications between the telephones, Tels 1 and 2, is registered at the CCU 28. As shown in FIG. 1, the telephones, Tels 1 and 2, are provided with IP addresses IP=AAAA and IP=BBBB, respectively. Likewise, the IP bridges 20 and 22 are provided with IP addresses IP=CCCC and IP=DDDD, respectively. On the other hand, the channel #0 of the highway 2MHW0 and a UDP port 0 are assigned to the telephone, Tel 3.

Assume that the operator of the telephone, Tel 1, for example, conversing with the operator of the telephone, Tel 2, calls up the telephone, Tel 3, by operating the keypad 48, FIG. 2, in order to invite the operator of the telephone, Tel 3, to the conversation. At this time, the telephone, Tel 2, is brought into its hold state. The operator of the telephone, Tel 3, answers the call and starts conversing with the operator of the telephone, Tel 1. In this condition, the operator of the telephone, Tel 1, again manipulates the keypad 48 in order to input a conference connection request. This request is sent to the CCU 28. In response, the CCU 28 registers a conference connection between the telephones, Tels 1, 2 and 3. The operators of the telephones, Tels 1, 2 and 3, may, of course, input the conference connection request at the same time. After the registration of the conference, the CCU 28 assigns the channels #0, #2 and #3 of the highway 2MHW1 and UDP ports 0, 1 and 2 to the telephones, Tels 1, 2 and 3, respectively, as conversation channels with respect to the conference trunk 24.

Voice signals from the telephones, Tels 1, 2 and 3 are transferred, as follows. Assume that the CPU 40 of the telephone, Tel 1, for example, receives a path connection request from the CCU 28 via the network 10 and MAC 36. In response, the CPU 40 connects voice input to the handset 46 of the telephone, Tell, to the channel #0 assigned to the telephone, Tel 1, on the highway 2MHW1 that accommodates the conference trunk 24. At the time of packetizing a voice signal, the CPU 40 selects the IP address IP=DDDD assigned to the IP bridge 22 and the UDP port 0 of the telephone, Tel 1, as the destination of a header, not shown. The CPU 40 then packetizes the voice signal and sends the resulting packet via the IP network 10.

Likewise, upon receiving a path connection request from the CCU 28 via the IP network 10, the telephone, Tel 2, connects voice input to its handset 46 to the channel #1 assigned to the telephone, Tel 2, on the highway 2MHW1 of the trunk 24. At the time of packetizing a voice signal, the telephone, Tel 2, selects the IP address IP=DDDD assigned to the IP bridge 22 and its own UDP port 1 for conference as the destination of a header. The telephone, Tel 2, then packetizes a voice signal and sends the resulting packet via the IP network 10.

As for the plain telephone Tel 3, the above procedure is assigned to the IP bridge 20. Specifically, in response to a path connection request received from the CCU 28 via the IP network 10, the IP bridge 20 connects voice received from the telephone, Tel 3, via the SLIC 16 to the channel #2 of the highway 2MHW1 of the conference trunk 24 assigned to the telephone, Tel 3. For this purpose, the IP bridge 20 selects the IP address IP=DDDD of the IP bridge 22 and the UDP port 2 assigned to the telephone, Tel 3, for the conference. The IP bridge 20 assembles a packet and sends it via the IP network 10.

The above packets are transferred via the IP network 10. The IP bridge 22 accommodating the conference trunk 24 receives the packets from the IP network 10 via the MAC 56. In the IP bridge 22, the CPU 60 analyzes the headers of the packets so as to determine whether or not the packets are meant for the IP bridge 22. The CPU 60 then writes voice data meant for the trunk 24 in the consecutive channels of the highway B2MHW1, i.e., writes voice signals received from the telephones, Tels 1, 2 and 3, in the channels #0, #1 and #3, respectively. As a result, the frame 100, FIG. 4, containing the above voice signals on the channels #0 through #3 is sent from the IP bridge 22 to the trunk 24 over the down-going highway B2MHW1.

The trunk 24 adds the voice signals received over, in this specific case, the channels #0 through #3 of the down-going highway B2MHW1 in the previously stated manner, as instructed by the CCU 28. The conference trunk or CFT 24 then writes the sum of the channels #1 and #2 in the channel #0 of the up-going highway F2MHW1, writes the sum of the channels #0 and #2 in the channel #1, and writes the sum of the channels #0 and #1 in the channel #2.

In the IP bridge 22, the CPU 60 receives the path connection request from the CCU 28 via the IP network 10 and MAC 56. In response, as for the voice signals of the channels #0 and #1 of the highway 2MHW1 accommodating the trunk 24, the CPU 60 selects the IP addresses IP=AAAA and IP=BBBB assigned to the telephones, Tels 1 and 2, respectively, as the destinations of headers for packetizing the above voice signals. The CPU 60 then packetizes the voice signals and sends the resulting packets via the IP network 10. This allows the voice signals of the channels #0 and #1 to be connected to the telephones, Tels land 2, respectively. As for the voice signal of the channel #2 of the highway 2MHW1, the PCU 60 selects the IP address IP=CCCC assigned to the IP bridge 20 and the UDP port 0 assigned to the telephone, Tel 3, as the destination of a header, packetizes the voice signal, and outputs the resulting packet to the IP network 10. This allows the voice signal of the channel #2 to be connected to the. channel #0 of the highway 2MHW0 accommodating the telephone, Tel 3.

The telephones, Tels 1 and 2, and IP bridge 20 each receive the above voice packets via the IP network 10, and each analyze the headers of the packets so as to separate only a voice signal from the packet meant there for. For example, in the telephone, Tel 1, belonging to a group of IP telephones 12, the CPU 40 identifies a packet meant for the telephone, Tel 1, and transfers it to the CODEC 42. The CODEC 42 decodes the packet and outputs the resulting voice signal via the receiver of the handset 46. The voice signal contains voices output from the telephones, Tels 2 and 3, added by the CFT 24. The telephone, Tel 2, operates in the same manner as the telephone, Tel 1, except that the voice signal meant there for contains voices output from the telephones, Tels 1 and 3.

On the other hand, in the IP bridge 20, the CPU 60 identifies a packet addressed to the IP bridge 20 on the basis of the headers of the packets received via the IP network 10. The CPU 60 transfers the identified packet to the 2MHW interface 62. The 2MHW interface 62 writes the above packet in the channel #0 of the down-going highway B2MHW0. The SLIC 16 receives and decodes the voice signal of the channel #0 and sends the decoded voice signal to the telephone, Tel 3: In this case, the voice signal contains voices output from the telephones, Tels 1 and 2, added by the CFT 24.

As stated above, the IP-PBX system handling voice signals in the form of IP packets allows a session to be held between the telephones, Tels 1, 2 and 3. Of course, the illustrative embodiment is capable of implementing a session even between four or more telephones as well as a session between the IP telephones 12 or between the plain telephones 14.

Figure 5:
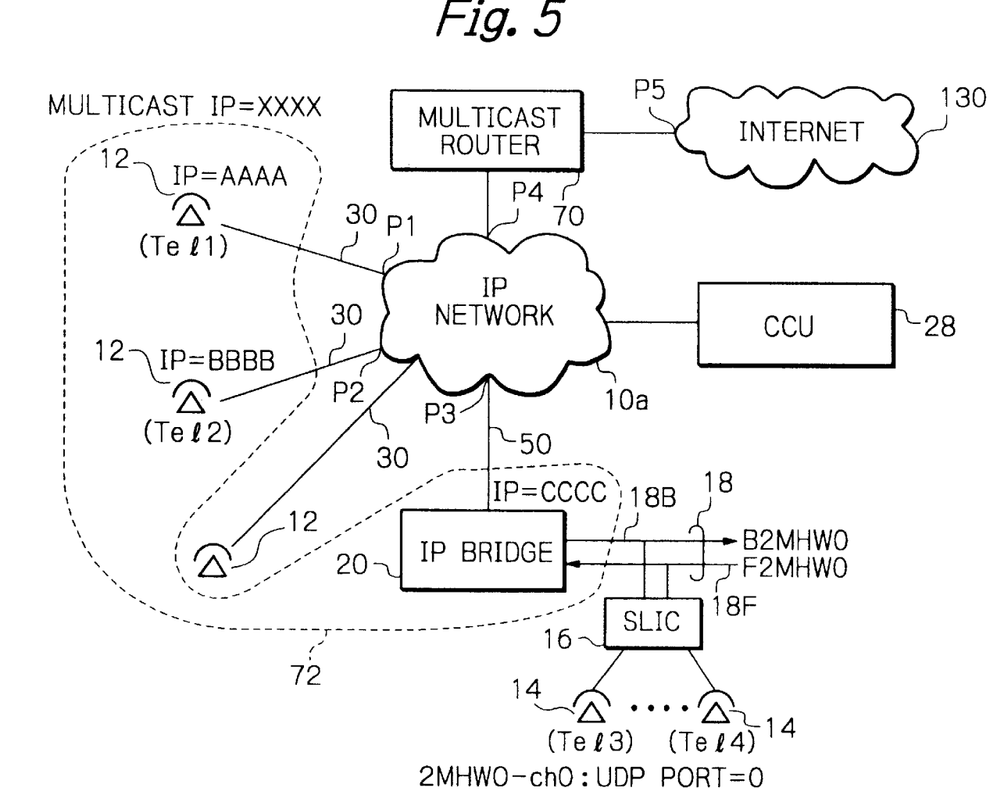
FIG. 5 is a diagram, similar to FIG. 1, showing an alternative embodiment of the present invention.

An alternative embodiment of the present invention will be described with reference to FIG. 5. As shown, this embodiment is identical with the previously described embodiment except that a multicast router 70 is substituted for the conference trunk 24 and facilities associated therewith, and in that an IP network 10a adaptive to multicast is substituted for the IP network 10. The multicast router 70 manages an IP multicast group that may be set up in the IP network 10a. In the illustrative embodiment, the router 70 supports the IGMP (Internet Group Management Protocol) that is a multicast protocol defined by RFC (Request for Comments) 1112 belonging to the IETF (Internet Engineering Task Force) standardization documents.

Specifically, the multicast router 70 is interconnected to the IP network 10 by a connection port P4 and sends IGMP inquiry packets to the IP-TELS 12, IP bridge 20 and other "terminals", as seen from the network 10a side, at a preselected period. Also, the multicast router 70 receives IGMP report packets returned from the above "terminals" in response to the inquiry packets. The IP network 10a monitors the IGMP inquiry packets and IGMP report packets flowing through the network 10a and constantly leans the configuration of a multicast group set up in the network 10a (function adaptive to multicast). Of course, the IP network 10a has the function of the IP network 10 described with reference to FIG. 1.

More specifically, to learn the configuration of a multicast group, the IP network 10a determines whether or not, e.g., ports P1 and P2 connecting the IP telephones 12 to the network 10a and a port P3 connecting the IP bridge 20 to the network 10a are included in a multicast group. Stated another way, a multicast address for a conference is assigned to a certain conference group, e.g., a group indicated by a dotted line 72 in FIG. 5, and the IP telephones 12 and/or plain telephones 14 to participate in the conference are registered at the IP network 10a.

In operation, assume again that a session is to be held between the telephones, Tels 1, 2 and 3. A connection for the session may be set up by any one of the methods described in relation to the previous embodiment. In any case, in response to a connection request for the session, the CCU 28 sends a path connection request meant for the telephones, Tels 1, 2 and 3 for causing them to effect conference telephone with a multicast IP address=XXXX.

The telephones, Tels 1 and 2, and IP bridge 20 having received the above pass connection request assemble respective IGMP report packets upon receiving an IGMP inquiry packet from the multicast router 70. The telephones, Tels 1 and 2, and IP bridge 20 then return the IGMP report packets to the multicast router 70, indicating it that they register a conference connection at the multicast IP address=XXXX. At this instant, by referencing the IGMP report packets, the IP network 10a recognizes that the connection ports P1, P2 and P3 respectively accommodated in the telephones, Tels 1 and 2, and IP bridge 20 belong to the multicast group 72 designated by the multicast address=XXXX.

Further, when the IP bridge 20 receives the path connection request from the CCU 28, it memorizes that the telephone, Tel 3, accommodated therein belongs to the multicast group 72 designated by the multicast address= XXXX. More specifically, the IP bridge 20 registers the telephone, Tel 3, at the group address=XXXX as the channel #0 of the highway 2MHW0.

Voice signals output from the telephones, Tels 1, 2 and 3, are transferred, as follows. The CPU 40 included in the telephone, Tel 1, for example, selects IP=XXXX as the destination of a header, packetizes a voice signal to be sent, and sends the resulting packet with the header IP=XXXX to the IP network 10a. The IP network 10a determines, based on the configuration of the multicast group 72 recognized, that the above voice packet is meant for the connection ports P2 and P3 relating to the multicast group 72. The IP network 10a therefore forwards the voice packet to the telephone, Tel 2, and IP bridge 20 accommodating the telephone, Tel 3. Of course, the IP network 10a does not transfer the voice packet to the port P1 accommodating the telephone, Tel 1. In this manner, the telephone, Tel 2, receives the voice signal output from the telephone, Tel 1. On the other hand, the IP bridge 20 having recognized the voice packet removes the header from the voice packet and writes the voice signal meant for the telephone, Tel 3, in the channel #0 of the down-going highway B2MHW0 in accordance with memorized information. As a result, the telephone, Tel 2, receives the voice signal.

A voice signal output form the telephone, Tel 2, is sent to the telephone, Tel 1, and IP bridge 20 in the form of a packet with the multicast IP address=XXXX in the same manner as the above voice signal. Likewise, when the IP bridge 20 receives a voice signal from the telephone, Tel 3, over the channel #0 of the up-going highway F2MHW0, the CPU 60 included in the IP bridge 20 selects IP=XXXX as the destination of a header, packetizes the voice signal, and sends the resulting packet with the header to the IP network 10a. This voice packet is transferred to the telephones, Tels 1and 2, via the connection ports P1 and P2, respectively. The IP network 10a, of course, does not transfer the same voice packet to the connection port P3 of the IP bridge 20.

Assume that two or more of the plain telephones 14 accommodated in the highway 18, which is interconnected to the IP bridge 20, are also registered at the above multicast group for a session. Then, on receiving voice data from one of the plain telephones 14 belonging to the multicast group via the up-going highway 18F, the IP bridge 20 transforms the voice data to an IP packet and sends it to the IP network 10a, i.e., to the terminals 12 other than the IP bridge 20. At the same time, the IP bridge 20 writes the voice data into the channel of the down-going highway 18B of the other plain telephone 14 accommodated in the highway 18 and belonging to the multicast group, and sends the voice data to the telephone 14. For example, when the telephones, Tels 3 and 4, accommodated in the highway 18 are registered at the same multicast group address=XXXX as the telephones, Tels 1 and 2, the IP bridge 20 packetizes voice data received from, e.g., the telephone, Tel 3, and sends the resulting IP packet to the IP network 10. At the same time, the IP bridge 20 writes the above voice data in the receipt channel of the telephone, Tel 4, also belonging to the multicast group. As a result, conversation can be held even between the terminals 14 accommodated in the same highway 18.

The multicast router 70 may additionally include a connection port P5 connected to, e.g., Internet 130. In this configuration, the multicast router 70 may receive an IGMP report packet requesting registration at the multicast group 72 designated by the multicast IP address=XXXX from the Internet via the port P5. In response, the multicast router 70 is capable of managing a conference connection belonging to the multicast group 72. For example, when the router 70 receives a voice packet with the multicast IP address= XXXX from the IP network 10a, it transfer's, or routes, the voice packet to the port P5 connected to the Internet 130. Also, the router 70 transfers packets received from Internet 130 via the port P5 to the IP network 10a in accordance with the multicast IP address=XXXX.

As stated above, in the IP-PBX system handling voice signals in the form of IP packets, the illustrative embodiment implements a conference telephone service by using the multicast router 70 in place of the conference trunk 24 of the earlier-described embodiment.

In summary, it will be seen that the present invention provides an IP conference telephone system, particularly an IP-PBX system handling voice signals in the form of IP packets with a conference trunk or a multicast router connected to an IP network, allowing a session to be held between telephones or similar terminals interconnected to the IP network.

The entire disclosure of Japanese patent application No. 162065/1999 filed Jun. 9, 1999 including the specification, claims, accompanying drawings and abstract of the disclosure is incorporated herein by reference in its entirely.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. An IP (Internet Protocol) conference telephone system comprising:

a network for transferring IP packets;

a plurality of telephone terminal systems comprising telephone terminals and accommodated in said network for converting packets received via said network to voice signals to thereby send the voice signals to the telephone terminal, and converting voice signals received from the telephone terminals to packets to thereby send the packets to said network;

a communication control unit interconnected to said network for setting up, in response to a conference connection request received from any one of said plurality of telephone terminal systems, a conference connection to at least three of said plurality of telephone terminal systems relating to the conference connection request;

a first highway for transferring voice signals multiplexed on channels of said highway;

a first IP bridge interconnected to said network and said first highway for multiplexing voice signals of packets received via said network and converting voice signals received via said first highway and multiplexed on the channels to packets to thereby send the packets to said network; and a conference trunk connected to said first highway for performing, upon receiving packets from said at least three telephone terminal systems, addition and subtraction with voice signals of the packets and returning results of the addition and subtraction to said first highway;

said at least three telephone terminal systems on which a conference connection is set up sending packets of voice signals received from the telephone terminals to said first network to address the packets to said conference trunk, whereby a conference is held between said at least three telephone terminal systems.

2. A system in accordance with claim 1, wherein at least one of said plurality of telephone terminal systems comprises an IP telephone.

3. A system in accordance with claim 1, wherein the telephone terminals include analog telephones, any one of said plurality of telephone terminal systems further comprising:

a second highway for transferring voice signals multiplexed on channels of said second highway;

a second IP bridge interconnected to said second highway and said network for multiplexing voice signals of packets received via said network on the channels and converting voice signals received via said second highway and multiplexed on the channels to packets to thereby send the packets to said network; and a subscriber circuit interconnected to said second highway and accommodating the analog telephones for multiplexing voice signals received from the analog telephones on the channels of said second highway and demultiplexing the channels received via said second highway to thereby send resulting voice signals to said analog telephones.

4. An IP conference telephone system comprising:

a network adaptive to multicast for transferring IP packets;

a plurality of telephone terminal systems comprising telephone terminals and accommodated in said network for converting packets received via said network to voice signals to thereby send the voice signals to the telephone terminal, and converting voice signals received from the telephone terminals to packets to thereby send the packets to said network;

a communication control unit interconnected to said network for setting up, in response to a conference connection request received from any one of said plurality of telephone terminal systems, a conference connection to at least three of said plurality of telephone terminal systems relating to the conference connection request; and a multicast router interconnected to said network for managing a multicast group including said at least three telephone terminal systems in accordance with a multicast address;

said at least three telephone terminal systems each assigning the multicast address to a packet of a voice signal output from a respective telephone terminal to send the packet to said network;

said network transferring, upon receiving the packet with the multicast address from any one of said at least three telephone terminal systems, the received packet to the others of said at least three telephone terminal systems, whereby a conference is held between said at least three telephone terminal systems.

5. A system in accordance with claim 4, wherein at least one of said plurality of telephone terminal systems comprises an IP telephone.

6. A system in accordance with claim 4, wherein the telephone terminals include analog telephones, any one of said plurality of telephone terminal systems further comprising:

a highway for transferring voice signals multiplexed on channels of said highway;

an IP bridge interconnected to said highway and said network for multiplexing voice signals of packets received via said network on the channels and converting voice signals received via said highway and multiplexed on the channels to packets to thereby send said packets to said network; and a subscriber circuit interconnected to said highway and accommodating the analog telephones for multiplexing voice signals received from the analog telephones on the channels of said highway and demultiplexing the channels received via said highway to thereby send resulting voice signals to the analog telephones.

* * * * *